United States Patent [19]

Holmes

[11] Patent Number: 4,569,255
[45] Date of Patent: Feb. 11, 1986

[54] AUTOMATIC TRANSMISSION CONTROLS WITH OFF-HIGHWAY MODE

[75] Inventor: Russell C. Holmes, Troy, Mich.

[73] Assignee: Eaton Corporation, Cleveland, Ohio

[21] Appl. No.: 649,631

[22] Filed: Sep. 12, 1984

[51] Int. Cl.$^4$ .................. B60K 41/18; B60K 41/10
[52] U.S. Cl. .................. 74/866; 74/752 D; 364/424.1; 192/0.092
[58] Field of Search .................. 74/866, 752 A, 752 D; 192/0.073, 0.09, 0.092, 0.094; 364/424.1

[56] References Cited

U.S. PATENT DOCUMENTS

| | | | |
|---|---|---|---|
| 3,640,156 | 2/1972 | Mori et al. | 74/866 |
| 3,684,066 | 8/1972 | Kubo et al. | 74/866 X |
| 3,776,048 | 12/1973 | Enomoto et al. | 74/866 |
| 3,876,028 | 4/1975 | Asano et al. | 74/866 X |
| 3,942,393 | 3/1976 | Forster et al. | 74/866 |
| 3,974,720 | 8/1976 | Iijima | 74/866 |
| 4,038,889 | 8/1977 | Lindow et al. | 74/886 |
| 4,039,061 | 8/1977 | Pruvot et al. | 74/866 X |
| 4,208,929 | 6/1980 | Heino et al. | 74/737 |
| 4,226,295 | 10/1980 | Rembold et al. | 74/866 X |
| 4,338,666 | 7/1982 | Suzuki et al. | 364/424.1 |
| 4,361,060 | 11/1982 | Smyth | 74/866 |
| 4,517,646 | 5/1985 | Magnusson et al. | 364/424.1 |

FOREIGN PATENT DOCUMENTS

| | | | |
|---|---|---|---|
| 0109850 | 8/1980 | Japan | 74/866 |
| 0203256 | 11/1983 | Japan | 74/866 |
| 0040052 | 3/1984 | Japan | 364/424.1 |
| 1158800 | 7/1969 | United Kingdom . | |
| 1159582 | 7/1969 | United Kingdom . | |

Primary Examiner—George H. Krizmanich
Assistant Examiner—Dirk Wright
Attorney, Agent, or Firm—C. H. Grace; H. D. Gordon

[57] ABSTRACT

An improved control for an automatic transmission, preferably an automatic mechanical transmission (10), is provided. The improved control includes an operator selectable mode of operation ($D_1$) for off-road and other higher resistance vehicle operating conditions. In the off-road mode of operation, the central processing unit (30) will generate upshift commands in accordance with an upshift shift point profile (OHU) such that, assuming constant output shaft speed and throttle position, the engine (12) output power following an upshift will be at least as great as the engine output power prior to the upshift.

31 Claims, 4 Drawing Figures

| DRIVE RATIO | RATIO |
|---|---|
| 1 | 12.70 |
| 2 | 10.60 |
| 3 | 8.87 |
| 4 | 7.34 |
| 5 | 6.12 |
| 6 | 5.11 |
| 7 | 4.27 |
| 8 | 3.53 |
| 9 | 2.98 |
| 10 | 2.49 |
| 11 | 2.08 |
| 12 | 1.72 |
| 13 | 1.44 |
| 14 | 1.20 |
| 15 | 1.00 |
| 16 | .83 |
| LOW R | 11.69 |
| HIGH R | 8.15 |

*Fig. 2*

AUTOMATIC TRANSMISSION CONTROLS WITH OFF-HIGHWAY MODE

BACKGROUND OF THE INVENTION

1. Field of the Invention

This invention relates to automatic power transmissions providing a plurality of gear reduction ratios, such as automatic mechanical transmissions, and to control systems therefor. In particular, the present invention relates to control systems for vehicles with throttle controlled engines and automatic transmissions wherein gear selection and shift decisions are made and executed based upon measured and/or calculated parameters such as vehicle or output shaft speed, input shaft or engine speed, throttle position, and the like. More particularly, the present invention relates to an automatic transmission control having a mode of operation, selectable by the operator, for high resistance operation wherein upshifts to a higher drive gear will only occur if, at a selected throttle position such as the current throttle position, the expected output power of the engine, after the shift, is at least equal to the engine output power prior to the shift.

2. Description of the Prior Art

The use of automatic transmissions of both the automatic mechanical type utilizing positive clutches and of the planetary gear type utilizing frictional clutches is well known in the prior art as are control systems therefor. Electronic control systems for automatic transmissions wherein gear selection and shift decisions are made based upon certain measured and/or calculated parameters such as vehicle speed, engine speed, rate of change of vehicle speed, rate of change of engine speed, throttle position, rate of change of throttle position, full depression of the throttle (i.e. "kickdown"), acutation of the braking mechanism, currently engaged gear ratio, and the like are known in the prior art. Examples of such automatic transmission control systems for vehicles may be seen by reference to U.S. Pat. Nos. 4,361,060; 4,073,203; 4,253,348; 4,038,889; 4,226,295; 3,776,048; 4,208,929; 4,039,061; 3,974,720 and 3,942,393, all hereby incorporated by reference.

While the above referenced automatic transmission control systems, and similar systems, are effective to control an automatic transmission by selecting a desired gear ratio which will tend to optimize the fuel economy and/or performance of the vehicle in view of the sensed parameters and then to commanding a shift into the selected gear ratio, such control systems were not totally acceptable as the predetermined programs utilized to generate a shift pattern, or patterns (also commonly referred to as a shift point profile) were, at best, a compromise of fuel efficiency operation and desirable vehicle performance operation, did not provide an operator selectable automatic mode for off-road high rolling resistance vehicle operation and/or did not provide shift patterns for the off-road mode of operation which assured that the engine power output, for a given throttle position, after an upshift was at least equal to the engine power output prior to the upshift.

SUMMARY OF THE INVENTION

In accordance with the present invention, the drawbacks of the prior art have been overcome or minimized by providing a control system, preferably an electronic and/or microprocessor based control system, for automatic transmissions, such as automatic mechanical transmissions, wherein gear selection and shift decisions are made and executed based upon measured and/or calculated parameters including engine speed, output shaft speed, and throttle position and wherein the predetermined program by which shift patterns are provided will recognize operator selected high resistance vehicle operating conditions and modify the generated shift patterns accordingly to provide optimal vehicle performance during such operating conditions.

The above is accomplished by providing a transmission control system including a central processing unit generating shift patterns based upon sensed or calculated engine speed and throttle position and wherein the shift patterns, at least the shift line at which upshifts are commanded, is modified in response to the processing unit sensing that the operator desires operation in the automatic mode for high resistance vehicle operating conditions.

Applicant has determined that proper operation under high resistance to vehicle movement, such as under heavy vehicle load, on steep grades, in sand or mud, or the like, requires that, for a given throttle setting, the engine power output after an upshift be at least as great as the engine power output prior to the upshift. Accordingly, in the selectable high resistance ("off-road") operation mode, the processor will, for a sensed throttle position and output shaft speed (i.e. vehicle speed), command upshifts only at engine speeds at which the engine output power is less than or equal to the output power of the engine in the next higher gear ratio and at the same throttle setting and output shaft speed.

Alternatively, the processor may be provided with means, such as formulas or look-up tables, to determine the engine power output at the same throttle position and output shaft speed in the next highest ratio and not command an upshift until the determined output power is at least equal to the engine output power prior to the upshift.

Thus, in the selectable high resistance or off-road mode of operation, the transmission will not be upshifted unless the engine is capable of pulling the vehicle load with the same throttle position in the next higher drive ratio.

Accordingly, it is an object of the present invention to provide a new and improved control system for automatic transmissions which will sense operator selected off-road or high resistance vehicle operating conditions and which will modify the shift patterns generated thereby accordingly.

Another object of the present invention is to provide an improved automatic transmission control having an operator selectable off-road or high resistance mode of operation wherein upshifts will occur only if the engine, under current output shaft speed and throttle position, has an output power in the next higher drive ratio at least equal to its output power in the currently engaged ratio.

These and other objects and advantages of the present invention will become apparent from a reading of the description of the preferred embodiment taken in connection with the attached drawings.

BRIEF DESCRIPTION OF THE DRAWINGS

FIG. 2 is a table illustrating the ratio of input shaft speed to outshaft shaft speed of a typical automatic mechanical transmission in the various drive ratios or drive gears thereof.

DESCRIPTION OF THE PREFERRED EMBODIMENT

Figure 1:
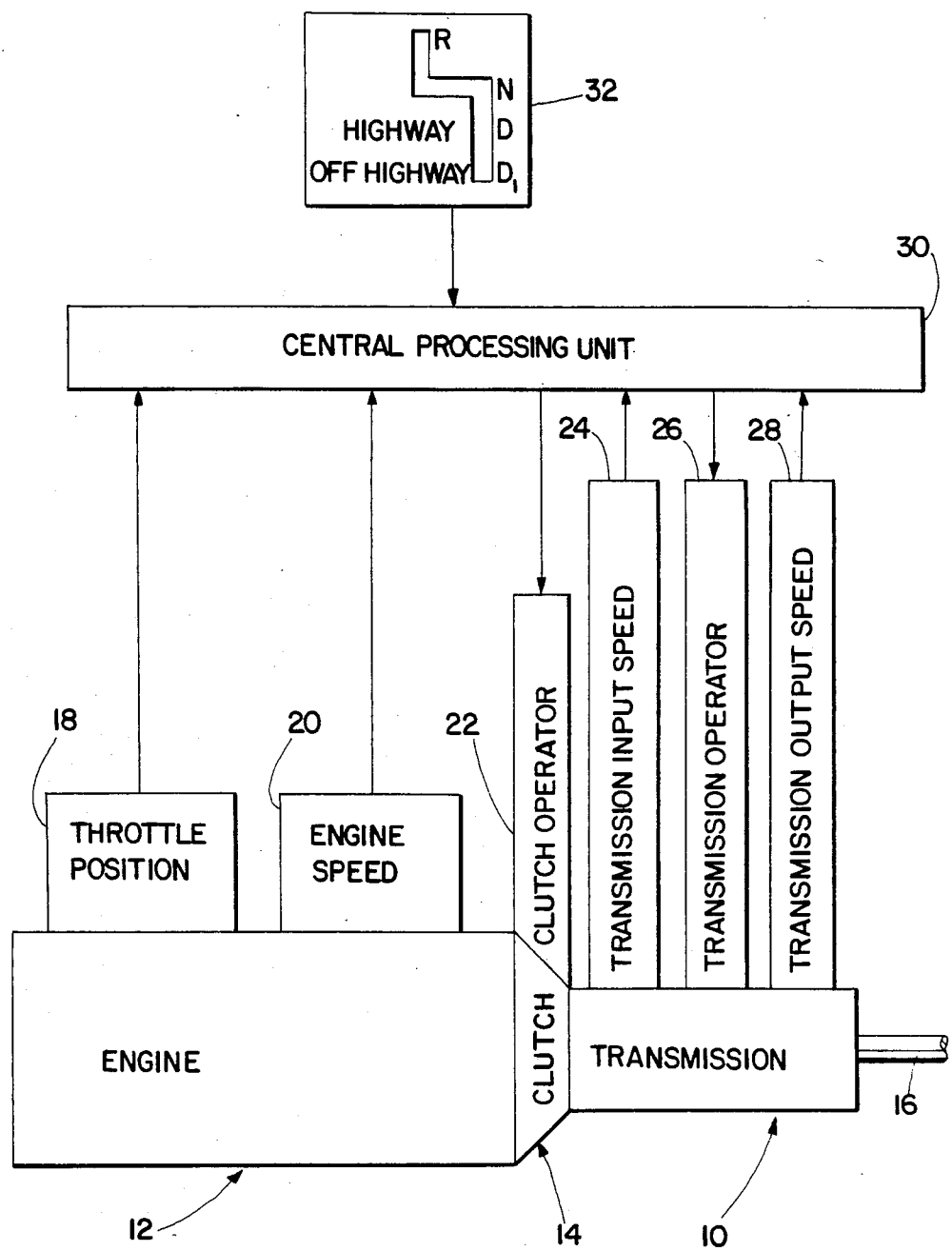
FIG. 1 is a schematic illustration of the components and interconnections of the automatic mechanical transmission control system of the present invention.

FIG. 1 schematically illustrates an automatic multi-speed change gear transmission 10 driven by a throttle controlled engine 12, such as a well known diesel engine, through a friction master clutch 14. The output of the automatic transmission 10 is output shaft 16 which is adopted for driving connnection to an appropriate vehicle component such as the differential of a drive axle, a transfer case or the like as is well known in the prior art. The above mentioned power train components are acted upon and monitored by several devices each of which will be discussed in greater detail. These devices include a throttle position or throttle opening monitor assembly 18 which senses the position of the operator controlled vehicle throttle or other fuel throttling device, an engine speed sensor 20 which senses the rotational speed of the engine, a clutch operator 22 which engages and disengages clutch 14, a transmission input shaft speed sensor 24, a transmission operator 26 which is effective to shift the transmission 10 into a selected gear ratio, and a transmission output shaft speed sensor 28.

The above mentioned devices supply information to and/or accept commands from a central processing unit 30. The central processing unit 30 may include analogue and/or digital electronic calculation and logic circuitry, preferably microprocessor based, the specific configuration and structure of which forms no part of the present invention. The central processing unit also receives information from a shift control assembly 32 by which the operator may select a reverse (R), neutral (N), on-highway forward drive (D) or off-road forward drive (D₁) mode of operation of the vehicle. Alternatively to providing a selectable $D_1$ position, a separate on-highway/off-road selector switch may be provided. An electrical power source (not shown) and/or source of pressurized fluid (not shown) provides electrical and/or pneumatic power to the various sensing, operating and/or processing units. Drive train components and controls therefor of the type described above are known in the prior art and may be appreciated in greater detail by reference to above mentioned U.S. Pat. Nos. 3,776,048; 4,038,889; 4,226,295 and 4,361,060.

As is known, the central processing unit 30 receives direct inputs from sensor 18 indicating the present throttle position, from sensor 20 indicating the present engine speed, from sensor 24 indicating the present transmission input shaft speed, from sensor 28 indicating the present transmission output shaft speed and from sensor 32 indicating the mode of operation selected by the vehicle operator or driver. In addition to these direct inputs, the central processing unit 30 may be provided with circuitry for differentiating the input signal from sensor 20 to provide a calculated signal indicative of the rate of acceleration of the engine, means to compare the input signals from sensor 24 and 28 to calculate a current engaged gear ratio, circuit means to compare the current engaged gear ratio with the signal from sensor 28 to provide a calculated engine speed and means to sense full depression or release of the throttle. The central processing unit also comprises a memory means for storing certain input and or calculated information and means for clearing the memory means upon the occurrence of a predetermined event. Additionally, the central processing unit may include a timing device, such as a capacitor which decays at a known rate and which may be reset upon the occurrence of a predetermined event to measure a predetermined time interval. Specific circuitry for providing the above mentioned functions is known in the prior art and an example thereof may be seen by reference to above mentioned U.S. Pat. No. 4,361,060.

Of course, assuming system lock-up (master clutch not slipping), input shaft speed and engine speed will be equal. Additionally, providing input signals indicative of any two of engine (or input shaft) speed, output shaft speed and current engaged drive ratio allows the processing unit to sense and/or calculate all three of these parameters. Further, assuming a known drive train, output shaft speed will be indicative of vehicle speed and vice versa.

The memory means incorporated into the central processing unit 30 may store information such as the direction of the last shift (i.e. upshift or downshift), position of the throttle, rate of change of throttle position, vehicle speed or the like. The memory means may be reset upon the occurrence of a specified event such as engine or vehicle speed exceeding a predetermined limit, full application of the throttle, operator throttle setting exceeding or predetermined limit, the occurrence of a gear change, etc.

Sensors 18, 20, 24 and 28 may be of any known type or construction for generating analog or digital signals proportional to the parameter monitored thereby. Similarly, operators 22 and 26 may be of any known electrical, pneumatic or electro-pneumatic type for executing operations in response to command signals from processing unit 30. Sensor 18 may also be an operator to vary fuel supply to the engine to achieve synchronous shifting conditions.

A purpose of the central processing unit is to select, in accordance with a program and current or stored parameters, the optimal gear ratio at which the transmission should be operating and if necessary to command a gear change, or shift, into the selected optimal gear ratio based upon the current and/or stored information.

Figure 4:
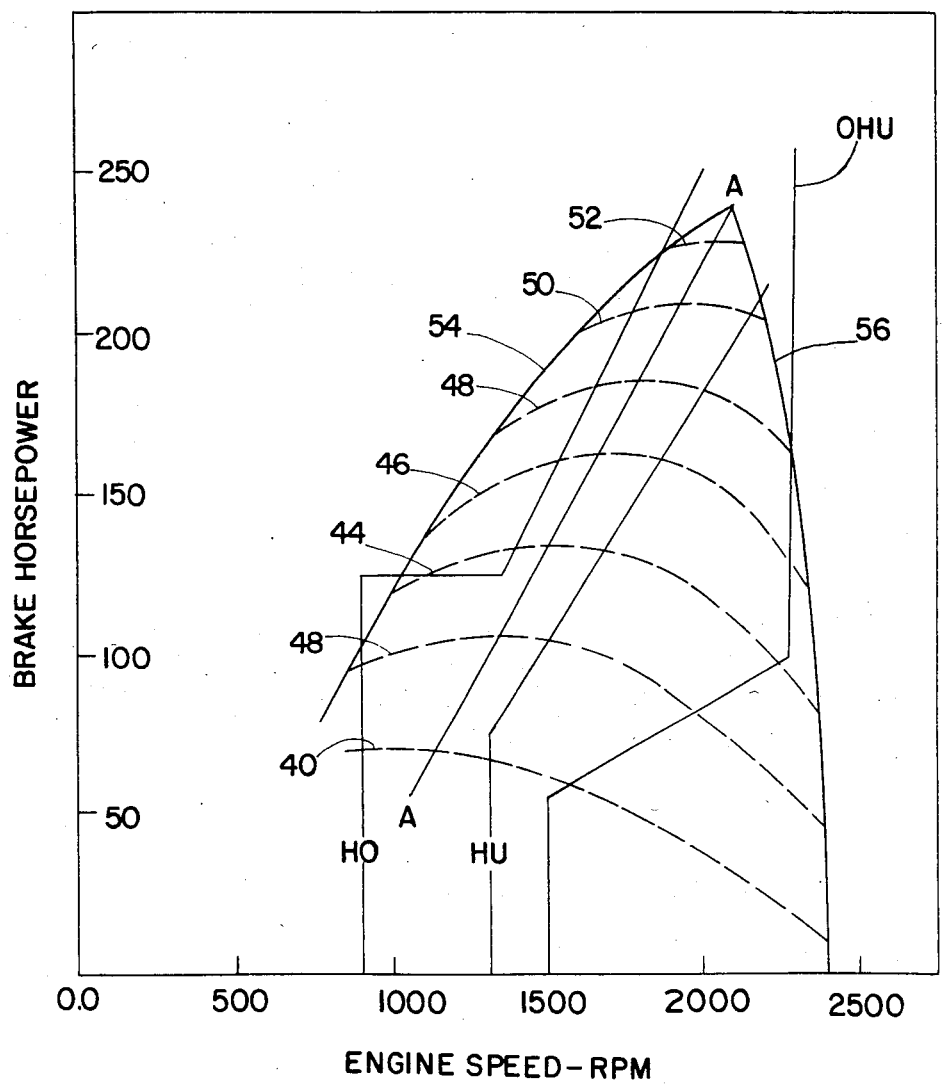
FIG. 4 is an engine fuel map similar to FIG. 3 with the on-highway upshift and downshift profiles and the off-road upshift profile projected thereon.

A primary purpose of the central processing unit program or logic rules is to generate a shift pattern, or shift point profiles, as is seen in FIG. 4. The shift point profiles generated by the central processing unit will determine if the transmission should remain in the currently engaged gear ratio, should be upshifted to the next highest gear ratio or should be downshifted to the next lower gear ratio. The shift point profiles are determined by a predetermined program acting upon current or stored information and are usually selected to provide a compromise between operation at the most fuel efficient possible gear ratio and operation in a gear ratio to provide optimal performance characteristics of the vehicle. The shift point profiles graphically illustrated in FIG. 4 are a function of both throttle position, expressed as a rate of fuel usage (often also expressed as a percentage of maximum throttling position), and engine speed. The engine speed may be directly sensed or, preferably, is calculated engine speed, corresponding to engine speed at drive train lock-up conditions and determined by multiplying the output shaft speed by the appropriate gear ratio, which will not vary during a shift transient as is known in the prior art.

It is understood that other sensed or calculated monitored speeds, such as input shaft speed, output shaft speed, vehicle speed or the like may be substituted for engine speed in the shift point profiles illustrated in FIG. 4.

Preferably, the automatic transmission 10 is of the automatic mechanical type. FIG. 2 illustrates the ratios of input shaft speed to output shaft speed in a typical sixteen forward speed-two reverse speed automatic transmission. It is noted that the forward speed steps or splits are all approximately equal to twenty percent (20%). For purposes of illustrations, all forward speed steps, i.e. changes in ratio, will be considered to be equal. Accordingly, to maintain an equal vehicle speed (i.e. a constant output shaft speed) during an upshift (shift to next highest drive ratio) the input shaft speed (engine speed) will be approximately twenty percent (20%) less after the upshift than prior to the upshift. Of course, assuming constant vehicle speed, engine speed will increase approximatey twenty percent (20%) as the result of a downshift, i.e. shift to the next lower drive ratio.

As used herein, a "higher" gear ratio or drive ratio will refer to a gear ratio having a lower ratio of input shaft speed to output shaft speed. For example, tenth (10th) gear is higher than ninth (9th) gear and a shift from ninth (9th) to tenth (10th) gear is an upshift.

As is known, for a specified internal combustion engine, such as a governed diesel engine utilized in a heavy duty truck, for each rate of fuel usage (determined by throttle position) there is an engine speed (usually expressed in revolutions per minute or "RPM"), or range of engine speeds, at which the engine is most fuel efficient. This optimal fuel efficiency operating condition is represented by the line A—A in FIG. 3. The speed at which engine 12 is rotating with clutch 14 fully engaged is determined by the vehicle speed and engaged drive line gear ratio, only the transmission ratio of which is usually conveniently selectively variable, in set increments, in the drive line schematically illstrated in FIG. 1.

Figure 3:
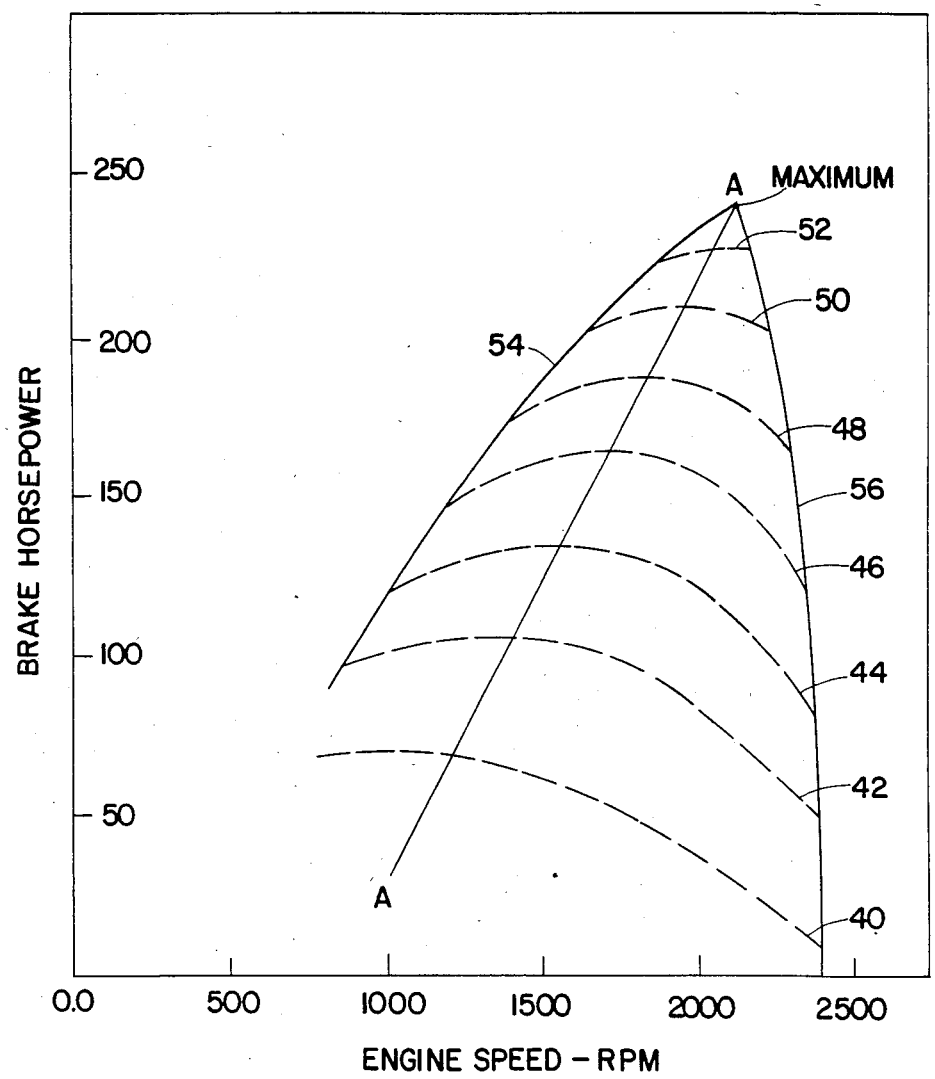
FIG. 3 is a graphical representation, usually called an "engine fuel map", of a typical throttle controlled, governed, diesel engine illustrating engine output power at various fuel usage rates (throttle positions) and engine speeds.

FIG. 3 illustrates an "engine fuel map" for a typical diesel engine governed to 2100 RPM. Engine output power (brake horsepower) is illustrated at various engine speeds and rates of fuel consumption. Lines 40, 42, 44, 46, 48, 50 and 52 are constant rates of fuel consumption corresponding approximately to constant throttle positions of 30%, 40%, 50%, 60%, 70%, 80% and 90%, respectively, of 100% or maximum throttle position. Line 54 corresponds to 100% or maximum throttle position while line 56 represents the "governor droop" portion of the fuel map.

Briefly, as is well known in the prior art, at above the governed RPM, the fuel supply to the engine is restricted resulting in decreased engine output power with increasing engine RPM. As may be seen, for each constant rate of fuel usage, engine output power is maximized at a given engine speed (line A—A) and output power decreases with increasing engine speed beyond the maximum output power engine speed.

FIG. 4 is an engine map similar to FIG. 3 onto which an on-highway upshift profile HU, an on-highway downshift profile HD and an off-road upshift profile OHU has been projected. For purposes of FIG. 4, it is assumed that all ratio steps of transmission 10 are equal, or substantially equal, and thus separate upshift and/or downshift profiles are not required for each drive ratio. It is understood, of course, that a single shift point profile may be utilized for all gear ratios of a transmission or a separate shift profile may be generated for each currently engaged gear ratio. Generally, the greater the difference in ratio splits or steps between the gears, the greater the desirability of separate shift point profiles for each current engaged gear ratio.

For on-highway or over-the-highway operating conditions, i.e. conditions of relatively low resistance to vehicle movement, the driver selects the highway or "D" mode of forward operation. Briefly, for selected on-highway operating conditions, within the space bounded by downshift line HD and upshift line HU no gear change is required, for operating conditions at or to the right of upshift line HU an upshift to the next highest gear ratio is required and for operating conditions within the area at or to the left of downshift line HD a downshift to the next lowest gear ratio is required.

To maximize fuel efficiency, the transmission should be shifted as quickly and as often as possible to maintain the speed of the engine as close as possible to the maximum fuel efficiency line A—A. This can be accomplished by placing the upshift line HU and the downshift line HD as closely as possible, while maintaining at least a minimum hysterisis to prevent speed related hunting for proper gear ratio, to the maximum fuel efficiency line A—A.

Another concern in selecting desired gear ratio, that is when generating shift point profiles, is vehicle performance. Vehicle performance may be defined as the ability to accelerate at at least a given rate and avoidance of unduly frequent up and down shifts, i.e. nuisance shifting. Generally, optimized vehicle performance requires that the upshift and downshift lines be spaced relatively distant from the optimum fuel efficiency line A—A.

It may be appreciated that maximizing of fuel economy and maximizing of vehicle efficiency are often in conflict. The placement of upshift and downshift lines, HU and HD, in a shift point profile is thus an attempt to achieve an optimal compromise between fuel efficiency and vehicle performance. As the relative importance of fuel efficiency and vehicle performance varies under different operating conditions, as determined by central processing unit 30 acting under current and/or stored information in accordance with a program, the upshift and downshift lines are preferably not static but are dynamic. Dynamically moving shift lines are known, and are discussed in greater detail in above-mentioned U.S. Pat. No. 4,361,060. Typically, the shift lines are moved in response to current and/or stored information such as direction of last shift, acceleration of the vehicle, acceleration of the engine, rate of change of throttle position, operation of the vehicle brake or the like.

It is important to understand that the shift point profiles are dependent upon the throttle position as well as the engine speed. Other than selecting a reverse, neutral or one of the forward drive modes of operation of the vehicle by manipulation of selector 32, the operator's only input to the transmission is his manipulation of the throttle pedal or other fuel control device as the case may be. Accordingly, by setting shift profiles and modifying same in partial response to throttle position, the operator's desires are accounted for by the central processing unit when deciding the optimal gear ratio at which the transmission is to operate.

The term throttle as used herein means the device or mechanism by which the vehicle operator indicates the amount of fuel he desires to supply to the engine. Usually, the operator can select any amount of fuel varying from zero percent (closed throttle) to 100 percent (full or wide open throttle) of maximum fuel supply. The actual device controlled may be a carburetor, a fuel injector and fuel injection rack or the like. Throttle position, which, subject to a governer, determines the rate of fuel usage, as used herein means the operator's selection of desired fuel supply to the engine expressed as a percentage of maximum fuel supply. This is typical of a "min-max" or automotive type governor on a Diesel truck engine.

While the on-highway shift profiles, HD and HU, as moved by the central processing unit 30 in accordance with certain logic rules, are highly desirable to provide an optimized dynamic compromise between fuel efficiency and vehicle performance, the on-highway upshift profile is not ideally suitable for certain off-road vehicle operating conditions. Under certain conditions of high resistance to vehicle movement, such as steep grades (in excess of 15%), heavy vehicle loading, operation in sand, mud, snow or the like, upshifting in accordance with the HU profile may provide undesirable vehicle operation.

When operating under certain high resistance conditions, the relative greater inertia of the vehicle will cause the vehicle to rapidly decelerate and/or the engine to stall if, as the result of an upshift, the engine output power in the newly engaged drive ratio is less than the engine output power prior to the upshift.

To alleviate this problem, an off-road mode of operation ($D_1$) may be selected by the operator. In the off-road mode of operation, upshifts are performed in accordance with the off-road upshift shift point line OHU as seen in FIG. 4, the off-road upshift line OHU is selected so that the output power of the engine at the current vehicle speed (i.e. constant output shaft speed) and current throttle position (i.e. constant rate of fuel usage) after an upshift from the currently engaged drive ratio (i.e. at an engine speed equal to present engine speed times the ratio of input shaft speed to output shaft speed in next higher ratio divided by ratio of input shaft speed to output shaft speed in the current ratio) is equal to or greater, preferably greater by at least ten percent (10%), than the current engine output power.

By way of example, referring to FIG. 4, assuming operation in 14th drive ratio at sixty percent throttle (line 46 rate of fuel usage), upshifts will occur at approximately 2250 RPM engine speed and 130 brake horsepower engine output power. Assuming constant vehicle speed and throttle position, the engine speed after the upshift, i.e. in 15th drive ratio, will be:

(2250 RPM)×(15th Ratio/14th Ratio)

or

2250 RPM×(1.00/1.20)

or

1875 RPM.

As may be seen, at 60% throttle and 1875 RPM engine speed, the engine output power will be approximately 162 Brake Horsepower, assuring that at constant throttle position the engine will continue to move the vehicle after an upshift. Even assuming the vehicle slowed 10% during the shift procedure, that is engine speed equalled about 1690 RPM after the upshift, engine output power would equal approximately 165 Brake Horsepower after the upshift.

The off-road upshift profile OHU may be selected such that, assuming constant vehicle speed and throttle position, engine output power after an upshift exceeds engine output power in the currently engaged drive ratio by a given percentage (preferably at least 10%). The off-highway upshift profile OHU may also be selected such that, assuming constant throttle position and a given decrease in vehicle speed during the upshift (preferably at least 10%) the engine output power after an upshift at least equals the current engine output power in the current engaged drive ratio.

Alternatively, in the off-highway mode of operation, i.e. driver selection of $D_1$, the control may simply be modified such that upshifts are not commanded unless the engine output power in the next higher ratio and at current output shaft speed and at full throttle (see lines 54 and 56) is at least as great as the engine output power prior to the upshift. By way of example, assuming equal splits of 20%, any upshift at an engine speed of 2200 RPM would be allowable as the maximum engine output power at 2200 RPM engine speed is approximately 215 brake horsepower while at 1850 RPM engine speed (after upshift to next higher drive ratio and constant output shaft speed) the full throttle engine output power is approximately 225 brake horsepower.

As may be appreciated, the off-road upshift profile, OHU, may be generated by a combination of the logic rules set forth above.

Accordingly, in the operator selected off-road mode of operation, the upshift profiles, OHU, assure that upshifts will not be made unless the engine is capable of powering the vehicle with the same (or at no greater than maximum) throttle setting in the next higher drive ratio.

Operation under high resistance conditions also may require starting at a lower gear ratio. Typically, in "D" the vehicle will start in fifth (5th) gear while in "D", the vehicle will be started in first (1st) gear.

Clutch operator 22 is preferably controlled by the central processing unit 30 and may engage and disengage master clutch 14 as described in U.S. Pat. No. 4,081,065, hereby incorporated by reference. Transmission 10 may include synchronizing means, such as an accelerator and/or a brake mechanism as described in U.S. Pat. No. 3,478,851, hereby incorporated by reference. The transmission 10 is preferable, but not necessarily, of the twin countershaft type as is seen in U.S. Pat. No. 3,105,395, hereby incorporated by reference.

Although the present invention has been set forth with a certain degree of particularity, it is understood the various modifications are possible without departing from the spirit and scope of the invention as hereinafter claimed.

I claim:

1. An improved automatic transmission system for vehicles having a throttle-controlled engine, an operator actuated throttling control means, an operator actuated mode of operation selection means, and a transmission having a plurality of gear ratio combinations selectively engageable between a transmission input shaft and a transmission output shaft, said transmission input shaft being operatively connected to said engine, said transmission system comprising, an information processing unit having means for receiving a plurality of input signals including (1) an input signal indicative of the position of said throttle controlling means, (2) an input signal indicative of the rotational speed of said engine and (3) an input signal indicative of the rotational speed of said output shaft, said processing unit including means for processing said input signals in accordance with a program to provide a predetermined gear ratio for a given combination of input signals and for generating output signals whereby said transmission system is operated in accordance with said program, and means associated with said transmission effective to actuate said transmission to effect engagement of one of said gear ratio combinations in response to said output signals from said processing unit, the improvement characterized by:

said input signals additionally including (4) an input signal indicative of operator selection of one of at least two selectable modes of forward vehicle operation, said program in one of said selectable forward modes of operation effective to generate output signals to upshift said transmission to the next higher gear ratio only at engine speeds at which the output power of the engine is not greater than the output power of the engine in the next higher gear ratio and at current throttle position and output shaft speed.

2. The improved system of claim 1, wherein said throttle-controlled engine is a diesel engine have a fuel governer means for decreasing the supply of fuel to the engine above a given engine speed.

3. The improved system of claim 1 wherein said program in said one of said selectable forward operating modes will generate output signals to upshift said transmission only at engine speeds at which the output power of the engine is at least a given percentage less than the output power of the engine in the next higher ratio and at current throttle position and output shaft speed.

4. The improved system of claim 3, wherein said predetermined percentage is at least ten percent.

5. The improved system of claim 2 wherein said program in said one of said selectable forward operating modes will generate output signals to upshift said transmission only at engine speeds at which the output power of the engine is at least a given percentage less than the output power of the engine in the next higher ratio and at current throttle position and output shaft speed.

6. The improved system of claim 5 wherein said predetermined percentage is at least ten percent.

7. The improved system of claim 1, wherein said program in said one of said selectable forward operating modes will generate output signals to upshift said transmission only at engine speeds such that the output power of the engine in the next higher gear ratio and at current throttle position and at not greater than a predetermined percentage of current output shaft speed is at least as great as the current output power of the engine.

8. The improved system of claim 7, wherein said predetermined percentage of current output shaft speed is not greater than ninety percent.

9. The improved system of claim 2, wherein said program in said one of said selectable forward operating modes will generate output signals to upshift said transmission only at engine speeds such that the output power of the engine in the next higher gear ratio and at current throttle position and at not greater than a predetermined percentage of current output shaft speed is at least as great as the current output power of the engine.

10. The improved system of claim 9, wherein said predetermined percentage of current output shaft speed is not greater than ninety percent.

11. The improved system of claim 3, wherein said program in said one of said selectable forward operating modes will generate output signals to upshift said transmission only at engine speeds such that the output power of the engine in the next higher gear ratio at current throttle position and at not greater than a predetermined percentage of current output shaft speed is at least as great as the current output power of the engine.

12. The system of claim 1, wherein said one of said selectable forward operating modes is intended for high resistance to forward vehicle operation conditions and another of said selectable forward operating modes is intended for relatively low resistance to forward vehicle operation conditions.

13. The system of claim 2, wherein said one of said selectable forward operating modes is intended for high resistance to forward vehicle operation conditions and another of said selectable forward operating modes is intended for relatively low resistance to forward vehicle operation conditions.

14. The system of claim 3, wherein said one of said selectable forward operating modes is intended for high resistance to forward vehicle operation conditions and another of said selectable forward operating modes is intended for relatively low resistance to forward vehicle operation conditions.

15. The system of claim 7, wherein said one of said selectable forward operating modes is intended for high resistance to forward vehicle operation conditions and another of said selectable forward operating modes is intended for relatively low resistance to forward vehicle operation conditions.

16. The system of claim 10, wherein said one of said selectable forward operating modes is intended for high resistance to forward vehicle operation conditions and another of said selectable forward operating modes is intended for relatively low resistance to forward vehicle operation conditions.

17. The system of claim 1, wherein said processing means includes means to sense or calculate the currently engaged gear ratio.

18. The system of claim 3, wherein said processing means includes means to sense or calculate the currently engaged gear ratio.

19. The system of claim 7, wherein said processing means includes means to sense or calculate the currently engaged gear ratio.

20. The system of claim 12, wherein said processing means includes means to sense or calculate the currently engaged gear ratio.

21. The system of claim 1, wherein said transmission has a plurality of selectable forward gear ratios and shifting of said transmission from one of said ratios to another of said ratios involves disengagement of a first positive clutch assembly and then engagement of a second positive clutch assembly.

22. The system of claim 3, wherein said transmission has a plurality of selectable forward gear ratios and shifting of said transmission from one of said ratios to another of said ratios involves disengagement of a first positive clutch assembly and then engagement of a second positive clutch assembly.

23. The system of claim 7, wherein said transmission has a plurality of selectable forward gear ratios and shifting of said transmission from one of said ratios to another of said ratios involves disengagement of a first positive clutch assembly and then engagement of a second positive clutch assembly.

24. The system of claim 10, wherein said transmission has a plurality of selectable forward gear ratios and shifting of said transmission from one of said ratios to another of said ratios involves disengagement of a first positive clutch assembly and then engagement of a second positive clutch assembly.

25. The system of claim 12, wherein said transmission has a plurality of selectable forward gear ratios and shifting of said transmission from one of said ratios to another of said ratios involves disengagement of a first positive clutch assembly and then engagement of a second positive clutch assembly.

26. The system of claim 17, wherein said transmission has a plurality of selectable forward gear ratios and shifting of said transmission from one of said ratios to another of said ratios involves disengagement of a first positive clutch assembly and then engagement of a second positive clutch assembly.

27. An improved automatic transmission system for vehicles having a throttle-controlled engine, an operator actuated throttling control means, an operator actuated mode of operation selection means, and a transmission having a plurality of gear ratio combinations selectively engageable between a transmission input shaft and a transmission output shaft, said transmission input shaft being operatively connected to said engine, said transmission system comprising, an information processing unit having means for receiving a plurality of input signals including (1) an input signal indicative of the position of said throttle controlling means, (2) an input signal indicative of the rotational speed of said engine and (3) an input signal indicative of the rotational speed of said output shaft, said processing unit including means for processing said input signals in accordance with a program to provide a predetermined gear ratio for a given combination of input signals and for generating output signals whereby said transmission system is operated in accordance with said program, and means associated with said transmission effective to actuate said transmission to effect engagement of one of said gear ratio combinations in response to said output signals from said processing unit, the improvement characterized by:

said input signals additionally including (4) an input signal indicative of operator selection of one of at least two selectable modes of forward vehicle operation, said program in one of said selectable forward modes of operation effective to generate output signals to upshift said transmission to the next higher gear ratio only at engine speeds at which the output power of the engine is not greater than the output power of the engine in the next higher gear ratio and at maximum throttle position and current output shaft speed.

28. The improved system of claim 27 wherein said program in said one of said selectable forward operating modes will generate output signals to upshift said transmission only at engine speeds at which the output power of the engine is at least a given percentage less than the output power of the engine in the next higher ratio and at maximum throttle position and current output shaft speed.

29. The improved system of claim 28, wherein said predetermined percentage is at least ten percent.

30. The improved system of claim 27, wherein said program in said one of said selectable forward operating modes will generate output signals to upshift said transmission only at engine speeds such that the output power of the engine in the next higher gear ratio at maximum throttle position and at no more than a predetermined percentage of current output shaft speed is at least as great as the current engine output power of the engine.

31. The improved system of claim 30, wherein said predetermined percentage of current output shaft speed is not greater than ninety percent.

* * * * *

UNITED STATES PATENT AND TRADEMARK OFFICE
CERTIFICATE OF CORRECTION

PATENT NO.    :   4,569,255
DATED         :   February 11, 1986
INVENTOR(S)   :   Holmes It is certified that error appears in the above—identified patent and that said Letters Patent is hereby corrected as shown below:

Column 1, above line 5, the following should be inserted:

GOVERNMENT RIGHTS STATEMENT

The U.S. Government has rights in this invention pursuant to Contract No. DAAE07-82-C-4121 awarded by the U.S. Department of Defense.

Signed and Sealed this

Nineteenth Day of April, 1988

*Attest:*

DONALD J. QUIGG

*Attesting Officer*  *Commissioner of Patents and Trademarks*